United States Patent
Flegel

(12) 
(10) Patent No.: US 6,184,461 B1
(45) Date of Patent: Feb. 6, 2001

(54) GENERATOR POWER INLET BOX WITH INTEGRAL GENERATOR CORD

(75) Inventor: David D. Flegel, Racine, WI (US)

(73) Assignee: Reliance Controls Corporation, Racine, WI (US)

(*) Notice: Under 35 U.S.C. 154(b), the term of this patent shall be extended for 0 days.

(21) Appl. No.: 08/990,172

(22) Filed: Dec. 12, 1997

(51) Int. Cl.[7] .................................................. H01J 5/00
(52) U.S. Cl. ................... 174/50; 174/58; 174/60; 174/135; 220/3.8; 220/4.02; 248/906
(58) Field of Search ................... 174/50, 68.1, 72 A, 174/135, 53, 59, 67, 48, 58, 60; 220/242, 4.02, 3.2, 3.8, 3.6; 439/535; 248/906; 29/868

(56) References Cited

U.S. PATENT DOCUMENTS

| | | | | |
|---|---|---|---|---|
| 2,856,470 | * | 10/1958 | Hyde | ..................................... 191/12.4 |
| 3,277,251 | | 10/1966 | Daly . | |
| 3,284,591 | | 11/1966 | Daly . | |
| 3,315,556 | * | 4/1967 | Speck | ..................................... 411/337 |
| 3,361,938 | | 1/1968 | Watson . | |
| 3,391,374 | | 7/1968 | Schleicher . | |
| 3,523,166 | | 8/1970 | Daly . | |
| 3,559,148 | | 1/1971 | Hafer . | |
| 3,636,237 | | 1/1972 | Hafer . | |
| 3,654,484 | | 4/1972 | Jorgenson et al. . | |
| 3,716,683 | | 2/1973 | Hafer . | |
| 3,723,942 | | 3/1973 | Dennison . | |
| 3,731,256 | | 5/1973 | Hafer . | |
| 3,739,321 | | 6/1973 | Murphy et al. . | |
| 3,742,431 | | 6/1973 | Kobyner . | |
| 3,781,765 | | 12/1973 | Schleicher . | |
| 3,922,053 | | 11/1975 | Hafer . | |
| 4,067,529 | | 1/1978 | Milcoy . | |
| 4,088,829 | | 5/1978 | Milcoy . | |
| 4,282,954 | * | 8/1981 | Hill | ..................................... 191/12.4 |
| 4,605,817 | * | 8/1986 | Lopez | ..................................... 174/67 |
| 5,070,252 | | 12/1991 | Castenschiold et al. . | |
| 5,174,773 | * | 12/1992 | Jones | ..................................... 439/147 |
| 5,268,850 | | 12/1993 | Skoglund . | |
| 5,402,323 | * | 3/1995 | Schwenk et al. | ..................... 361/816 |
| 5,579,201 | * | 11/1996 | Karageozian | ........................ 411/337 |
| 5,717,164 | * | 2/1998 | Shetterly | ............................... 174/58 |
| 5,773,757 | * | 6/1998 | Kenney et al. | ........................ 174/53 |

OTHER PUBLICATIONS

GENTRAN Catalog, GT1094C, Reliance Time Controls, Inc. 1820 Layard Avenue, Racine, WI 53404, No Date.

\* cited by examiner

*Primary Examiner*—Kristine Kincaid
*Assistant Examiner*—Dhiru R Patel
(74) *Attorney, Agent, or Firm*—Andrus, Sceales, Starke & Sawall, LLP

(57) ABSTRACT

A remote power inlet arrangement for use with a portable generator having a power outlet, for providing auxiliary power to the main electrical panel or load center of a building. The power inlet arrangement includes a power inlet which is secured inside a power inlet enclosure. An electrical cord is attached at one end to the power inlet. The electrical cord has a plug at a second end which can be engaged with the power outlet of the portable generator. The electrical cord remains connected to and is stored with the power inlet inside the power inlet enclosure when not in use. A door having a peripheral resilient seal is attached to the power inlet enclosure to provide a weathertight seal when the door is in a closed position. A securing mechanism is provided to maintain the door in its closed position.

16 Claims, 3 Drawing Sheets

GENERATOR POWER INLET BOX WITH INTEGRAL GENERATOR CORD

FIELD OF THE INVENTION

In general, the invention relates to a power inlet arrangement. In particular, the invention relates to a power inlet arrangement for providing power from a generator to a load center.

BACKGROUND OF THE INVENTION

Portable generators may be used in certain situations to feed electrical power to residential and commercial load circuits during a utility power outage. These systems frequently include a power inlet box which conducts electrical power from the generator to a transfer switching mechanism. The transfer switching mechanism continues the electrical path through to selected electrical loads through circuit breakers located at the transfer switch or electrical subpanel.

In the past, the use of a portable generator involved finding or assembling an electrical cord which can be plugged in at one end to the power generator and at the other end to the power inlet box. This involves additional time and expense on the part of the installer or user. Further, the fact that the cord is separate from the generator makes it possible for the cord to become misplaced or lost, and thus unavailable when needed.

The situation arises where, because of the inconvenience associated with the above mentioned procedure, it is desirable to maintain an electrical cord and its associated power inlet box together. When portable generators are used, the need for any additional cords or adaptor fittings would not arise.

BRIEF SUMMARY OF THE INVENTION

It is an object of the present invention to provide a power inlet arrangement having a permanently affixed cord with a plug for connection to a portable power generator. It is a further object of the invention to provide a power inlet arrangement including an enclosure within which a cord is stored when not in use. Yet another object of the invention is to provide a power inlet arrangement which is relatively simple in its components and assembly, and which provides significant convenience to the user by ensuring the power inlet cord is always available when needed.

In one aspect of the invention, a power inlet arrangement for use with a portable generator having a power outlet includes a power inlet and a power inlet enclosure which contains the power inlet. The power inlet is secured inside the power inlet enclosure, which defines an inner wall and an internal cavity. An electrical cord has a first end that is securely attached to the power inlet and a second end having an electrical plug. The electrical cord is movable relative to the power inlet between an operating position and a storage position. In the operating position, the electrical plug is withdrawn from the power inlet enclosure and engaged with the power outlet of the portable generator. In the storage position, the electrical cord is stored within the internal cavity defined by the power inlet enclosure. The power inlet is secured adjacent to the inner wall of the power inlet enclosure.

The power inlet enclosure includes a door which is movable between an open position and a closed position. The open position of the door provides access to the electrical cord within the internal cavity defined by the enclosure, and the closed position of the door maintains the electrical cord within the power inlet enclosure when the electrical cord is in its storage position. Preferably, the power inlet enclosure includes a series of walls defining the internal cavity within which the electrical cord is received when in its storage position, and the door is hingedly mounted to one of the walls for movement between its open and closed positions. A peripheral resilient seal may be disposed between the door and the walls of the power inlet enclosure when the door is in its closed position for providing a weathertight seal therebetween. The power inlet enclosure may include a notch for receiving the electrical cord when in its operating position for enabling the door to be moved to its closed position. The door also may include a second notch for receiving the electrical cord when in its operating position and when the door is in its closed position. The power inlet enclosure further includes a latching arrangement for securing the door and selectively preventing access to the interior of the power inlet enclosure when the door is in its closed position. The door provides selective access to the internal cavity when in its open position for enabling a user to move the cord between its operating and storage positions and for providing selective access to the power inlet.

In another aspect of the invention, a flexible cord defines a first end fixed to a power inlet and electrically connected to an electrical, panel, and a second end which has a plug that is engageable with the generator power outlet. The power inlet is remote from the electrical panel, and an enclosure is associated with the power inlet and the plug of the flexible cord can be withdrawn from the enclosure to selectively engage the generator power outlet. The enclosure includes a door and a securing mechanism for selectively securing the door to the enclosure and preventing access to the interior of the enclosure. Preferably, the first end of the cord is interconnected with the power inlet via a member threadedly engageable with an extension member of the power inlet for fixedly mounting the first end of the cord to the power inlet and providing an electrical connection therebetween. Preferably, the power inlet is at least partially defined by the enclosure.

The present invention also contemplates a method of providing an electrical cord usable with the portable generator, generally in accordance with the aforementioned aspects of the invention.

Various other features, objects, and advantages of the invention will be made apparent from the following detailed description and the drawings.

BRIEF DESCRIPTION OF THE SEVERAL VIEWS OF THE DRAWINGS

The drawings illustrate the best mode presently contemplated of carrying out the invention.

In the drawings.

DETAILED DESCRIPTION OF THE INVENTION

Figure 1:
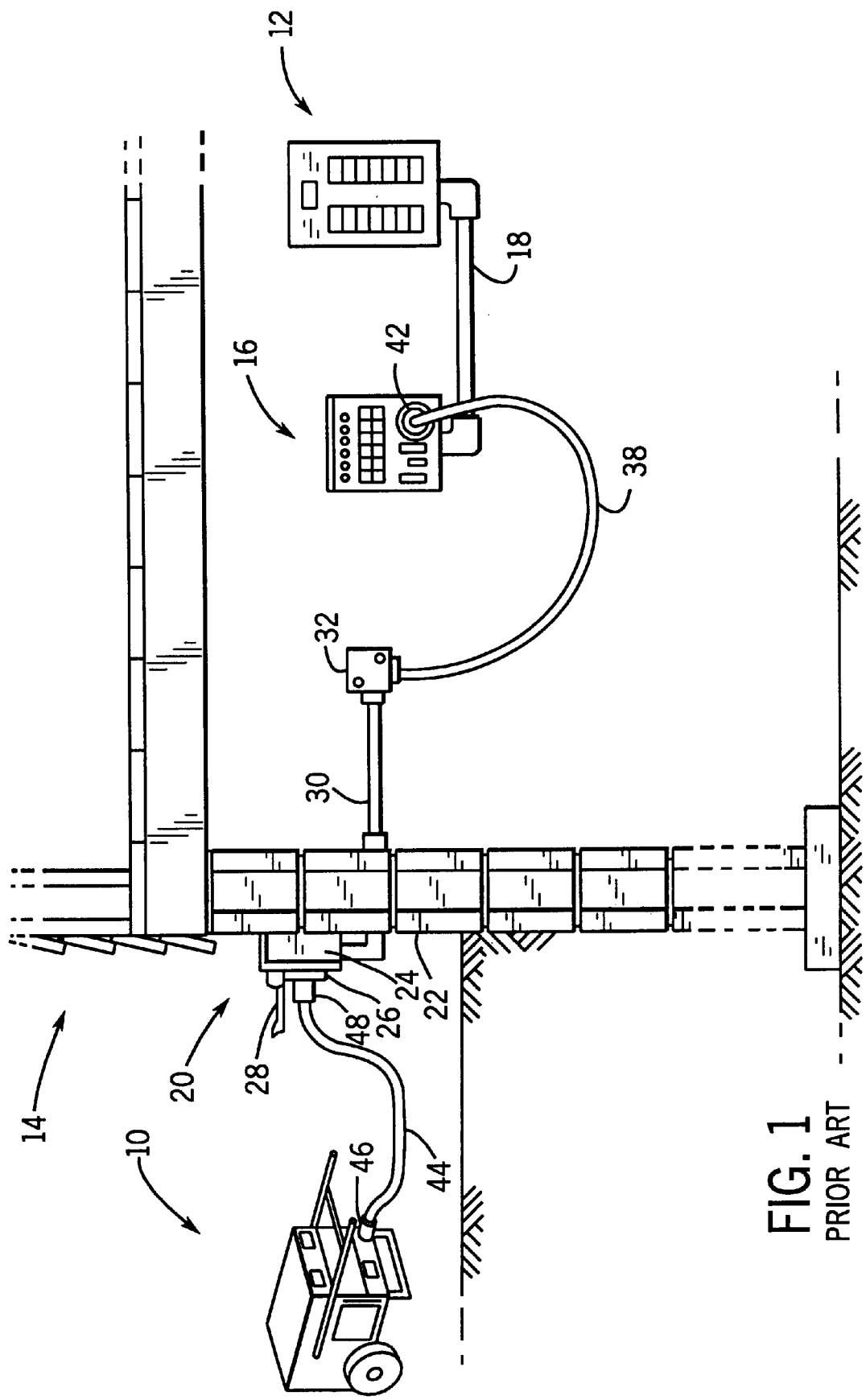
FIG. 1 is a schematic representation showing a prior art power inlet arrangement for interconnecting a portable power generator with an electrical panel associated with a building.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Time Controls, Inc. of Racine, Wis. under the designation GEN/TRAN (e.g. model 20216 or any other satisfactory model).

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via hinge structure, and is movable between an open position as shown in FIG. 1 and a closed position in which cover 28 encloses receptacle 26 when not in use. At conduit 30 extends between inlet box 20 and a junction box 32, and a flexible cord 38 is attached at one end to junction box 32. At its opposite end, flexible cord 38 has a plug 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with recessed power inlet 26, for transferring power generated by generator 10 to power inlet box 20, which is then supplied through the wiring in conduit 30, junction box 32, cord 38 and plug 42 to transfer panel 16, and from transfer panel 16 through the wiring in conduit 18 to main panel 12. In this manner, generator 10 functions to provide power to selected circuits of main panel 12 during a power outage period. Cord 44, which connects generator 10 to power inlet box 20, is often a custom-made cord in which plug 46 and connector 48 are specially selected according to the configuration of the generator power outlet and power inlet 26, respectively. Alternatively, it is possible to construct a cord such as 44 utilizing conventional power cords together with specialized adaptor fittings. Either way, it can be difficult to provide such a cord having correct fittings for both the outlet of generator 10 and power inlet 26 of power inlet box 20. Furthermore, cord 44 is separate from both generator 10 and power inlet box 20, which gives rise to problems in properly storing cord 44 when not in use so as to ensure cord 44 is not lost or misplaced.

Figure 2:
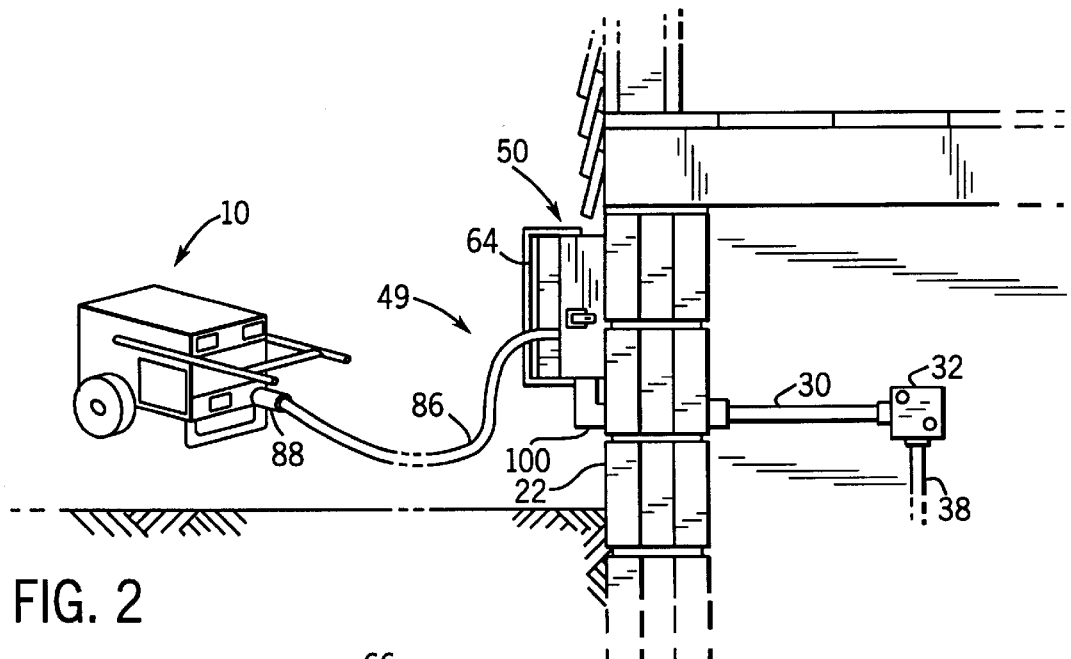
FIG. 2 is schematic representation similar to FIG. 1, showing the power inlet arrangement in accordance with the present invention.

FIG. 2 illustrates a power inlet arrangement 49 of the invention for providing power from generator 10 to main electrical panel 12. As shown in FIG. 2, the prior art power inlet box 20 of FIG. 1 is replaced with a power inlet enclosure, shown generally at 50, mounted to building wall 22. Conduit 30, junction box 32 and cord 38 are of the same construction and configuration as illustrated in FIG. 1, for transferring power from power inlet enclosure 50 to transfer panel 16 in the same manner as is known in the prior art.

Figure 3:
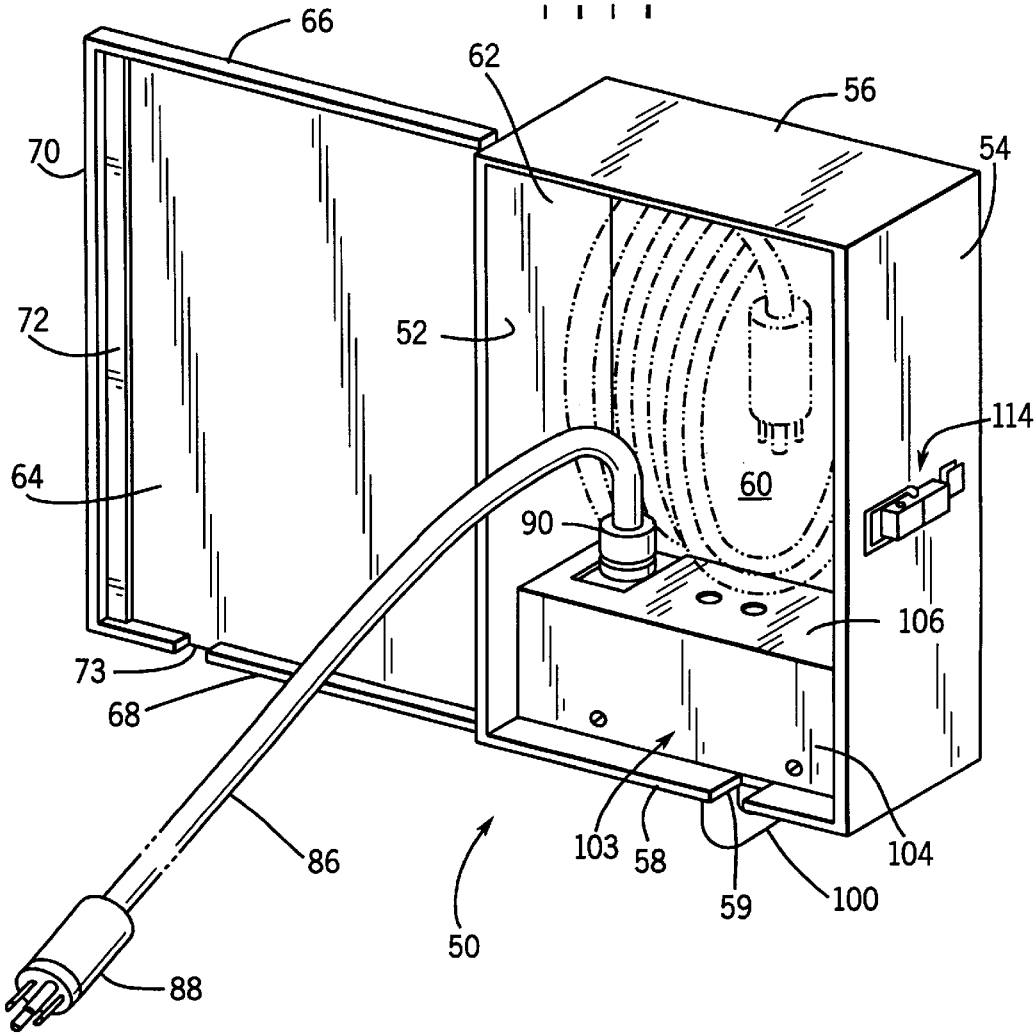
FIG. 3 is an isometric view of a power inlet assembly for use in the power inlet arrangement of FIG. 2.

Referring to FIGS. 2 and 3, power inlet enclosure 50 includes a box having a pair of side walls 52, 54, and top and bottom end walls 56, 58, respectively. A notch 59 is formed in bottom end wall 58. Enclosure 50 further includes a back wall 60, which cooperates with side walls 52, 54, and end walls 56, 58 to define an internal cavity 62. Enclosure 50 further includes a door 64 hingedly mounted to side wall 52, for movement between an open position as shown in FIG. 3 providing access to cavity 62, and a closed position in which door 64 engages the outer edges of walls 52–58 for closing cavity 62 and preventing access thereto. Door 64 includes upper and lower lips 66, 68, respectively, as well as side lips 70. A peripheral resilient seal 72 is located at the outer edges of door 64 adjacent lips 66–70, and is engageable with the outer edges of walls 52–58 when door 64 is closed so as to provide a weathertight seal for cavity 62. A notch 73 is formed in lower lip 68.

Figure 4:
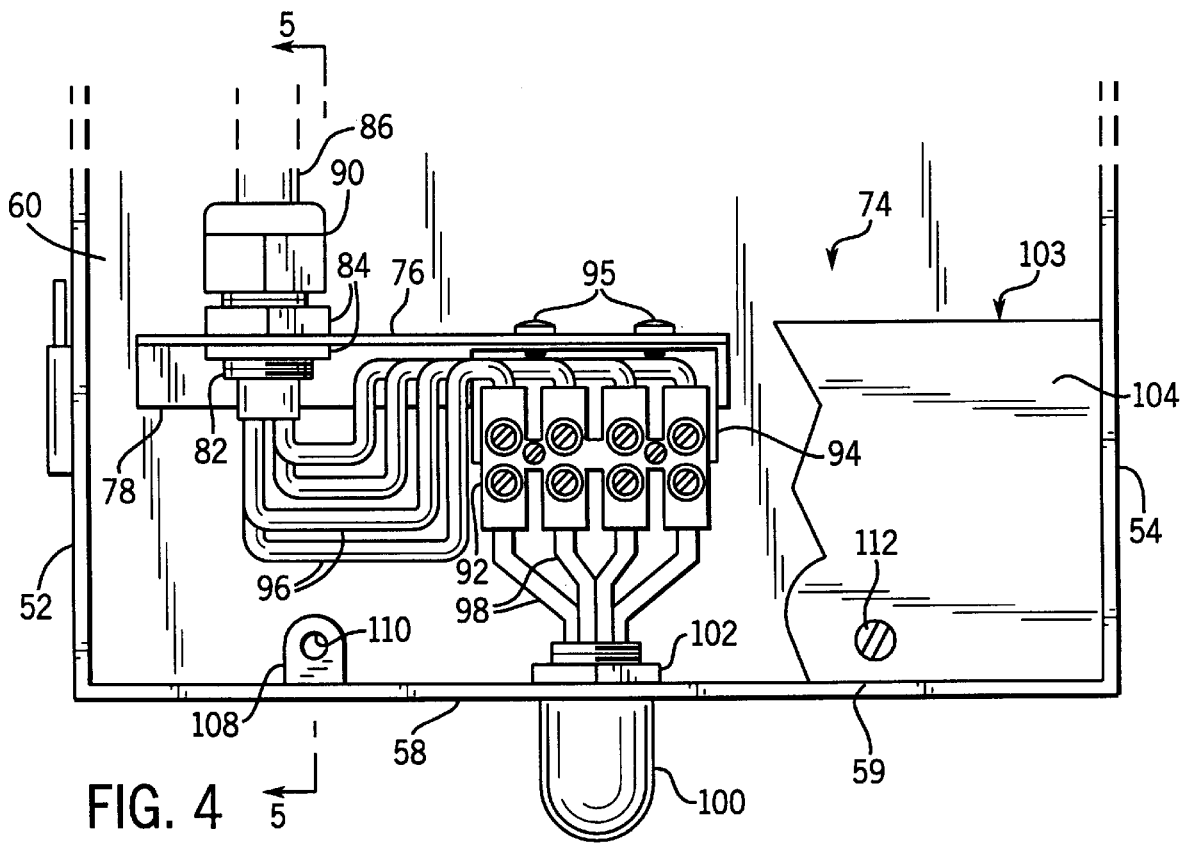
FIG. 4 is a partial front elevation view, with portions broken away, showing the lower portion of the power inlet assembly of FIG. 2.
Figure 5:
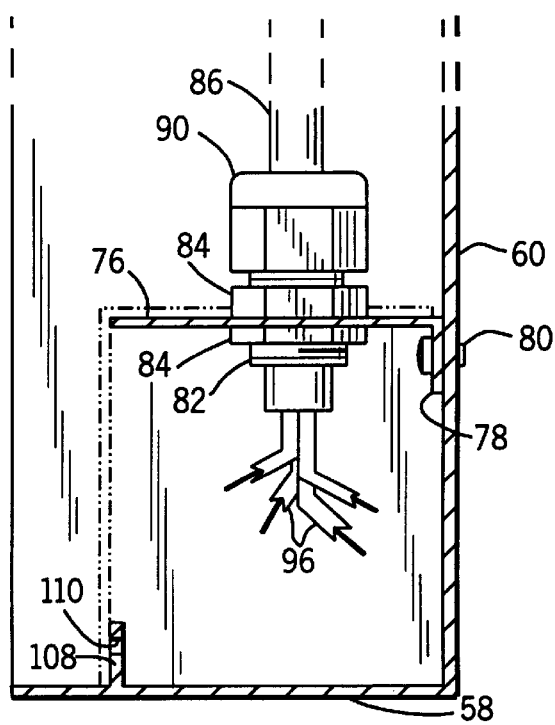
FIG. 5 is a partial section view taken along line 5—5 of FIG. 4.

Referring to FIGS. 3–5, a power inlet 74 is received within the lower portion of cavity 62. Power inlet 74 includes a rear bracket 76 mounted to back wall 60 via a flange 78 and a series of fasteners 80. A threaded nipple 82 extends through an opening formed in bracket 76, and a pair of lock nuts 84 are engaged with the threads of nipple 82, located one on either side of bracket 76, for rigidly securing nipple 82 to bracket 76.

Power inlet arrangement 49 further includes a flexible cord 86 having a plug 88 at its outer end. Plug 88 is configured so as to be engageable with the power outlet of generator 10. The end of cord 86 opposite plug 88 is nonremovably fixed to power inlet housing 74 in any satisfactory manner. As shown in FIGS. 3–5, the end of cord 86 is fixed to power inlet housing 74 via a threaded sleeve 90, which functions to clamp cord 86 against the upper end of nipple 82.

As shown in FIG. 4, power inlet housing 74 includes a junction block 92 secured to the vertical leg of an inverted L-shaped bracket member 94, the horizontal leg of which is mounted to bracket 76 via a pair of fasteners 95. In accordance with known construction, cord 86 includes a series of wires 96 electrically connected at their ends to junction block 92. A series of wires 98 are also connected to junction block 92, and extend through an elbow 100 mounted to lower wall 58 via a lock nut 102, for supply to conduit 30 within the interior of building 14. In this manner, wires 96, junction block 92 and wires 98 provide an electrical path for supplying power from generator 10 to main panel 12 when plug 88 is engaged with the power outlet of generator 10.

Power inlet housing 74 further includes a cover member 103 including a vertical wall 104 and a horizontal wall 106. Vertical wall 104 is engageable with a pair of upstanding tabs 108 (FIG. 4), each of which includes a threaded opening 110. A pair of openings are formed in vertical wall 104 in alignment with openings 110, and fasteners 112 extend through the openings in vertical wall 104 and into threaded engagement with openings 110 for securing cover member 103 in place within the internal cavity 62. Horizontal wall 106 is supported by bracket 76, and includes a notch for receiving upper lock nut 84. With this construction, cover member 103 can be removed relatively easily so as to provide access to junction block 92 for connecting wires 98 thereto.

A latch assembly 114 is mounted to side wall 54, and a catch is mounted to vertical lip 70 of door 64. In a manner as is known, latch assembly 114 is operable to selectively maintain door 64 in its closed position preventing access to internal cavity 62, or to enable door 64 to be moved to its open position as shown in FIG. 3. Latch assembly 114 and its associated catch preferably include a locking arrangement, in a manner as is known, for receiving a lock to prevent operation of latch assembly 114 and to maintain door 64 in its closed position.

In operation, power inlet arrangement 49 is operable to connect generator 10 with main electrical panel 12 as follows. The user first operates latch assembly 114 so as to release door 64, and door 64 is moved to its open position of FIG. 3 to provide access to internal cavity 62, within which cord 86 and plug 88 are stored when not in use. The user then withdraws cord 86 and plug 88 from internal cavity 62, and places cord 86 within notch 59 formed in bottom wall 58. Door 64 can then be returned to its closed position, and notch. 73 receives cord 86 for enabling door 64 to be fully closed. Latch assembly 114 is then operated to secure door 64 closed. Plug 88 is then engaged with the power outlet of generator 10 in a conventional manner, and generator 10 is operated to supply power to main panel 12 through transfer panel 16. When power is restored or when it is no longer desired to operate generator 10 for any other reason, plug 88 is disengaged from the power outlet of generator 10 and door 64 is returned to its open position. The user then places cord 86 and plug 88 into internal cavity 62 above power inlet housing 74, such that cord 86 and plug 88 are fully contained therewithin. Door 64 is then returned to its closed position and maintained closed by latch assembly 114, so that cord 86 is fully enclosed within internal cavity 62 and stored in preparation for a subsequent use.

It can thus be appreciated that power inlet arrangement 49 provides a unique, convenient mechanism for storing a generator connecting cord when not in use and avoiding the inconvenience of locating or constructing a specially made cord for connection to a generator. The invention combines a generator power inlet with cord storage, while at the same time anchoring one end of the cord and directly wiring the cord to the wiring for supplying power to the main electrical panel in order to provide quick, easy and reliable connection of generator 10 when needed.

Various alternatives and embodiments are contemplated as being within the scope of the following claims particularly pointing out and distinctly claiming the subject matter regarded as the invention.

What is claimed is:

1. A power inlet arrangement for use with a portable generator having a power supply outlet, comprising: an enclosure including walls defining an internal cavity, wherein the enclosure includes a door which is selectively movable between an open position providing access to the internal cavity and a closed position for maintaining an electrical cord within an interior of the enclosure when the electrical cord is in a storage position; a power inlet housing located within the internal cavity of the enclosure, wherein the power inlet housing includes one or more walls located within the internal cavity and defining an interior within which a junction block is located, wherein the junction block is adapted for interconnection with a power transfer panel for controlling the supply of power from the generator to an electrical system of a building; and wherein the electrical cord has a first end fixedly attached to the power inlet housing and a second end having an electrical plug, wherein the electrical cord includes a series of wires engaged with the junction block within the interior defined by the one or more walls of the power inlet housing, and wherein the electrical cord is adapted to be stored within the internal cavity of the enclosure when not in use and maintained therein by movement of the door to the closed position, and wherein the electrical cord is adapted to be withdrawn from the internal cavity for use by movement of the door to the open position and withdrawal of the cord outwardly of the internal cavity, wherein the first end of the cord is maintained in fixed engagement with the power inlet housing upon movement of the cord outwardly of the internal cavity and wherein the plug at the second end of the cord is engageable with the power supply outlet of the generator to supply power to the cord and to the junction block, and through the junction block to the power transfer panel and building electrical system.

2. The power inlet arrangement of claim 1, wherein the first end of the cord is attached to the power inlet housing by means of a nipple secured to a bracket of the power inlet housing wherein the nipple defines an internal passage through which the wires of the cord extend, and a sleeve engaged with the nipple and with the first end of the cord for fixedly securing the first end of the cord to the nipple.

3. The power inlet arrangement of claim 2, wherein the nipple is threaded, and wherein the sleeve comprises a threaded sleeve engaged with the threaded nipple.

4. The power inlet arrangement of claim 1, wherein the one or more walls of the power inlet housing are disposed at an angle relative to each other, wherein each of said one or more walls defines an end adapted for placement adjacent to one of a first wall and a second wall of the walls of the enclosure, wherein the first and second walls of the enclosure cooperate with the said one or more walls of the power inlet housing to define the interior of the power inlet housing.

5. The power inlet arrangement of claim 4, wherein the power inlet housing is located at a lower portion of the internal cavity defined by the walls of the enclosure, and wherein the cord is adapted to be placed within the internal cavity of the enclosure above the power inlet housing.

6. The power inlet arrangement of claim 5, wherein the one or more walls of the power inlet housing comprise an upstanding vertical wall extending upwardly from one of said walls of the enclosure, and a transverse horizontal wall extending laterally from an upper end of the upstanding vertical wall.

7. The power inlet arrangement of claim 6, wherein the vertical and the horizontal walls are removable relative to the walls of the enclosure, for selectively providing access to the junction block.

8. The power inlet arrangement of claim 4, wherein the walls of the enclosure define an opening, and the door is pivotably mounted to one of the walls of the enclosure for selectively providing access to the internal cavity through the opening and preventing access to the internal cavity through the opening.

9. The power inlet arrangement of claim 8, wherein the internal cavity is open and wherein the cord is adapted to be coiled for placement into the internal cavity.

10. The power inlet arrangement of claim 4, wherein one of the walls of the enclosure includes a notch adapted to receive the cord when the cord is withdrawn from the internal cavity.

11. The power inlet arrangement of claim 10, wherein the door includes one or more lips, and further comprising a notch provided in one of the lips in alignment with the notch provided in the enclosure wall for accommodating the cord when the cord is withdrawn from the internal cavity and the door is in the closed position.

12. A method of connecting a portable generator to an electrical system of a building, comprising the steps of mounting an enclosure to a wall of the building, wherein the enclosure includes walls defining an internal cavity and wherein the enclosure includes a door which is selectively movable between an open position providing access to the internal cavity and a closed position preventing access to the internal cavity, wherein the enclosure further includes an electrical cord having a first end and a second end, wherein the second end of the electrical cord includes an electrical plug adapted to engage with a power supply outlet of the generator, and wherein the first end of the electrical cord is fixedly attached to a power inlet arrangement interconnected with the enclosure, wherein the power inlet arrangement includes a power inlet housing located within the internal cavity of the enclosure, wherein the power inlet arrangement establishes an electrical connection of the electrical cord with a power transfer panel interconnected with the electrical system of the building, and wherein the electrical cord is adapted to be stored within the internal cavity when not in use; selectively moving the door to the open position to provide access to the internal cavity and to the electrical cord; withdrawing the electrical cord from the internal cavity; and engaging the plug at the second end of the electrical cord with the power supply outlet of the portable generator.

13. The method of claim 12, wherein the first end of the electrical cord is secured to a mounting member interconnected with one of said walls of the enclosure, and wherein the step of storing the cord within the internal cavity is carried out by placing the cord within the internal cavity above the mounting member.

14. The method of claim 13, further comprising the step of mounting wall structure within the internal cavity for forming a compartment, within which a junction block is located, wherein the second end of the electrical cord is interconnected with the junction block, and wherein a set of wires are engaged with the junction block for interconnection with the electrical system of the building.

15. The method of claim 12, further comprising the step of moving the door of the enclosure to the closed position when the cord is withdrawn from the internal cavity.

16. The method of claim 15, further comprising the step of engaging the cord within a notch formed in a wall of the enclosure, wherein the notch establishes communication exteriorly of the enclosure.

* * * * *